(12) United States Patent
Song

(10) Patent No.: US 8,331,278 B2
(45) Date of Patent: Dec. 11, 2012

(54) MANAGING AN ASSIGNMENT OF UNICAST TRAFFIC CHANNELS TO ACCESS TERMINALS PARTICIPATING IN A MULTICAST SESSION WITHIN A WIRELESS COMMUNICATIONS NETWORK

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

(21) Appl. No.: 12/411,937

(22) Filed: Mar. 26, 2009

(65) Prior Publication Data

US 2009/0245157 A1    Oct. 1, 2009

Related U.S. Application Data

(60) Provisional application No. 61/040,521, filed on Mar. 28, 2008.

(51) Int. Cl.
    *H04H 20/71*      (2008.01)
    *H04J 3/26*      (2006.01)
    *H04J 3/16*      (2006.01)
    *H04W 4/00*      (2009.01)
    *H04W 72/00*      (2009.01)

(52) U.S. Cl. ........ 370/312; 370/329; 370/432; 370/437; 455/452.1

(58) Field of Classification Search .................. 370/230, 370/236, 310.2, 312, 328, 336–338, 349, 370/390, 392, 400–401, 432, 436, 443, 445, 370/447, 459, 468; 455/450–455
See application file for complete search history.

(56) References Cited

U.S. PATENT DOCUMENTS

| 7,324,497 | B2 * | 1/2008 | Ikeda et al. ................... 370/345 |
| 7,669,220 | B2 * | 2/2010 | Goode ............................ 725/95 |
| 8,014,331 | B2 * | 9/2011 | Sarkar et al. .................. 370/312 |
| 2003/0054807 | A1 | 3/2003 | Hsu et al. |
| 2003/0086423 | A1 * | 5/2003 | Hsu ............................. 370/390 |
| 2004/0162071 | A1 | 8/2004 | Grilli et al. |

(Continued)

FOREIGN PATENT DOCUMENTS

WO      2006058345      6/2006

OTHER PUBLICATIONS

International Search Report, PCT/US2009/038502, International Searching Authority, European Patent Office, Jul. 30, 2009.

(Continued)

*Primary Examiner* — Tri H Phan
(74) *Attorney, Agent, or Firm* — Raphael Freiwirth

(57) ABSTRACT

In an embodiment, an access terminal sends a multicast session registration request to an access network. The access network determines whether to assign a unicast traffic channel (e.g., media access control (MAC) identifier (ID)) to the access terminal, for the access terminal to provide feedback (e.g., channel quality indicators (CQIs) associated with the multicast session, based on a number of access terminals that have been assigned unicast traffic channels for the multicast session and/or for applications other than the multicast session. The access network configures a traffic channel assignment message to include an identifier for the multicast session, and to further include an assignment of the unicast traffic channel if the determining step determines to assign the unicast traffic channel to the access terminal. The access network sends the traffic channel assignment message to the access terminal including at least the multicast session identifier.

31 Claims, 6 Drawing Sheets

U.S. PATENT DOCUMENTS

2004/0213214 A1 10/2004 Jung et al.
2005/0163076 A1 7/2005 Vannithamby et al.
2008/0261582 A1* 10/2008 Sarkar et al. ............... 455/422.1
2009/0046689 A1* 2/2009 Ikeda et al. ................... 370/338
2009/0129323 A1* 5/2009 Chen et al. .................... 370/329

OTHER PUBLICATIONS

Written Opinion, PCT/US2009/038502, International Searching Authority, European Patent Office, Jul. 30, 2009.

* cited by examiner

MANAGING AN ASSIGNMENT OF UNICAST TRAFFIC CHANNELS TO ACCESS TERMINALS PARTICIPATING IN A MULTICAST SESSION WITHIN A WIRELESS COMMUNICATIONS NETWORK

CLAIM OF PRIORITY UNDER 35 U.S.C. §119

The present Application for patent claims priority to Provisional Application No. 61/040,521, entitled "Methods of managing access to a unicast traffic channel for multicast session feedback within a wireless communications network", filed Mar. 28, 2008, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to managing an assignment of unicast traffic channels for access terminals participating in a multicast session within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, an access terminal sends a multicast session registration request to an access network. The access network determines whether to assign a unicast traffic channel (e.g., media access control (MAC) identifier (ID)) to the access terminal, for the access terminal to provide feedback (e.g., channel quality indicators (CQIs) associated with the multicast session, based on a number of access terminals that have been assigned unicast traffic channels for the multicast session and/or for applications other than the multicast session. The access network configures a traffic channel assignment message to include an identifier for the multicast session, and to further include an assignment of the unicast traffic channel if the determining step determines to assign the unicast traffic channel to the access terminal. The access network sends the traffic channel assignment message to the access terminal including at least the multicast session identifier.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
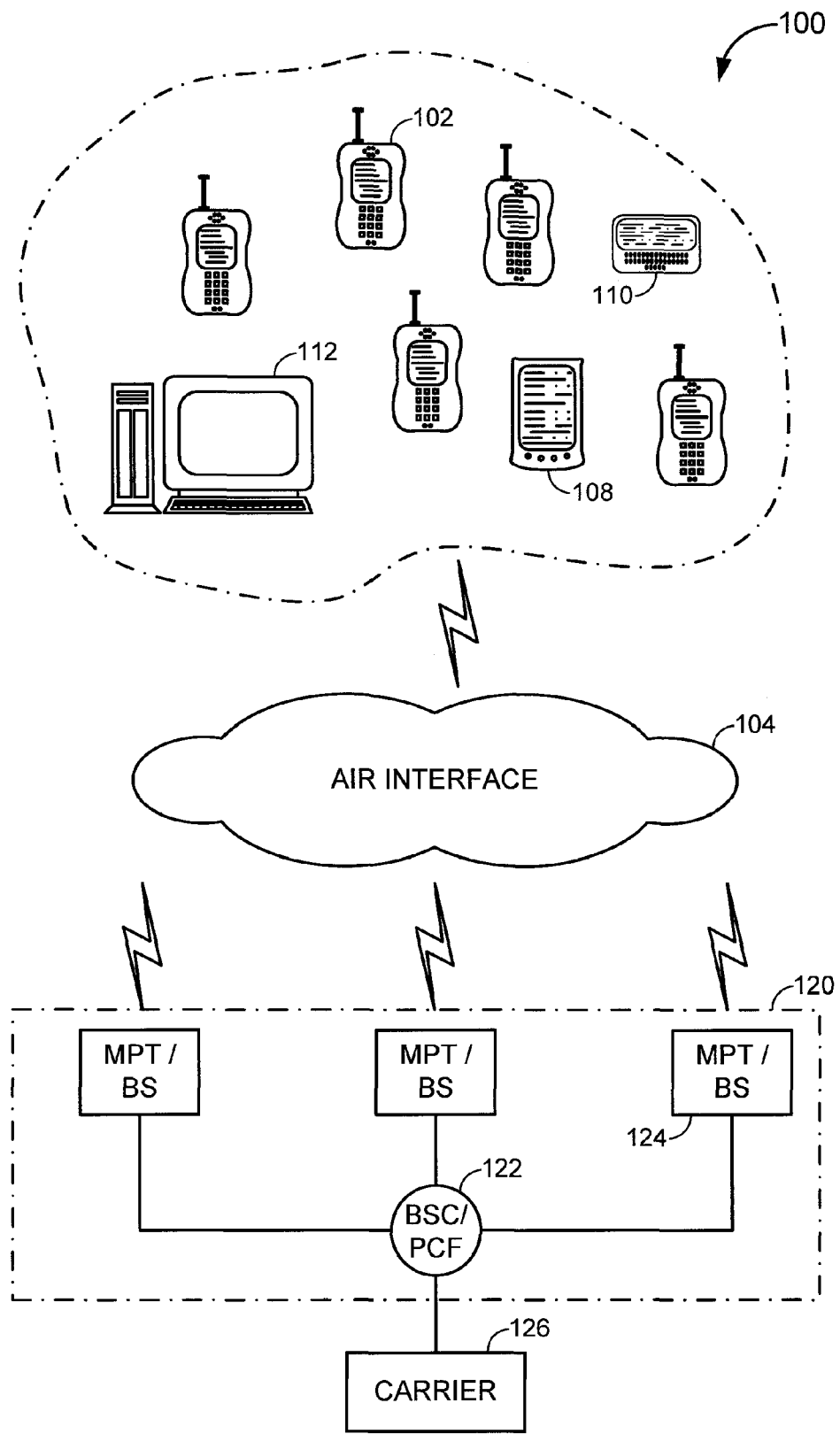
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
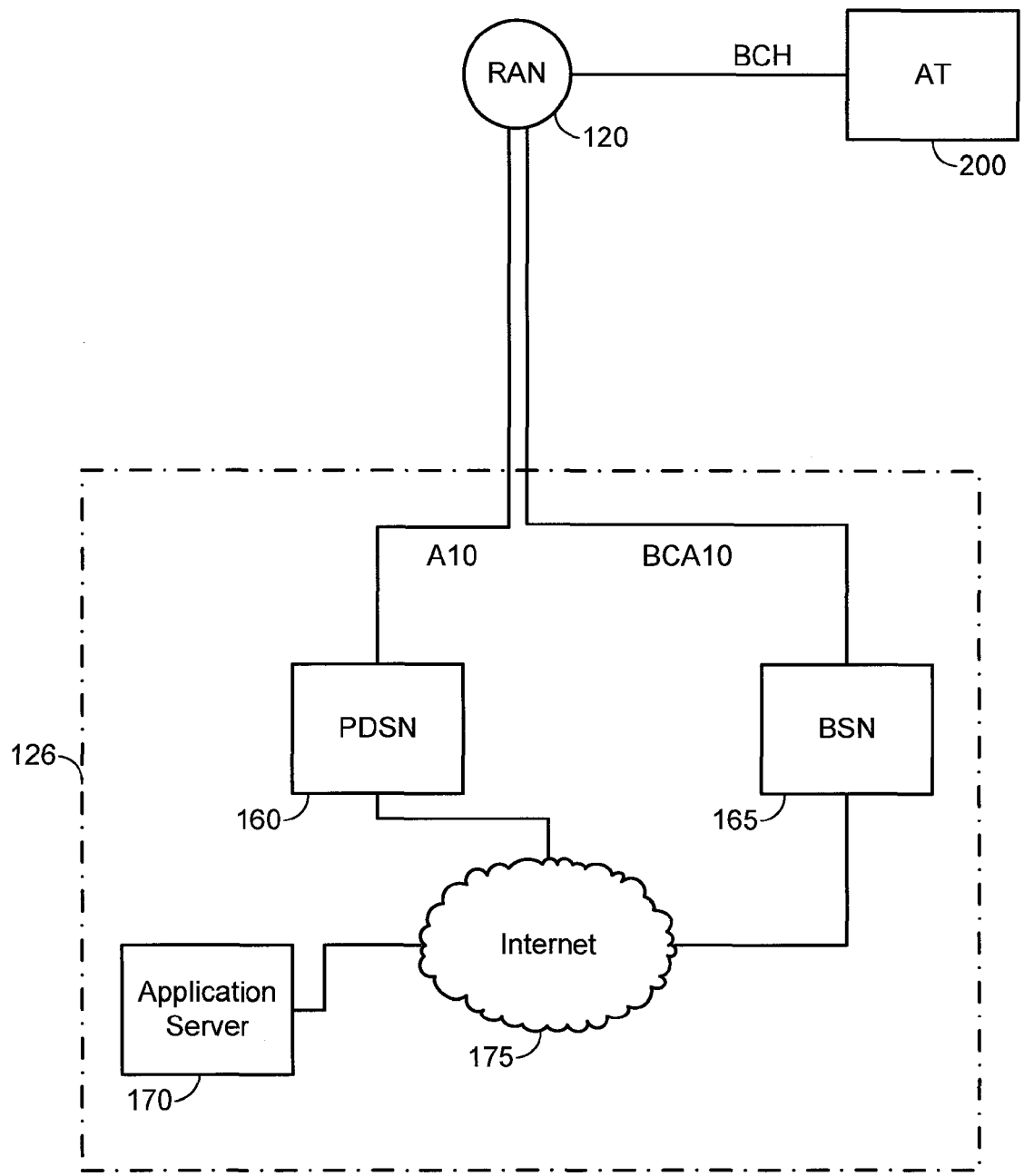
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast service network (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over the air interface 104 via a downlink channel (e.g., a broadcast channel (BCH), a control channel, etc.) to one or more access terminals 200.

Figure 3:
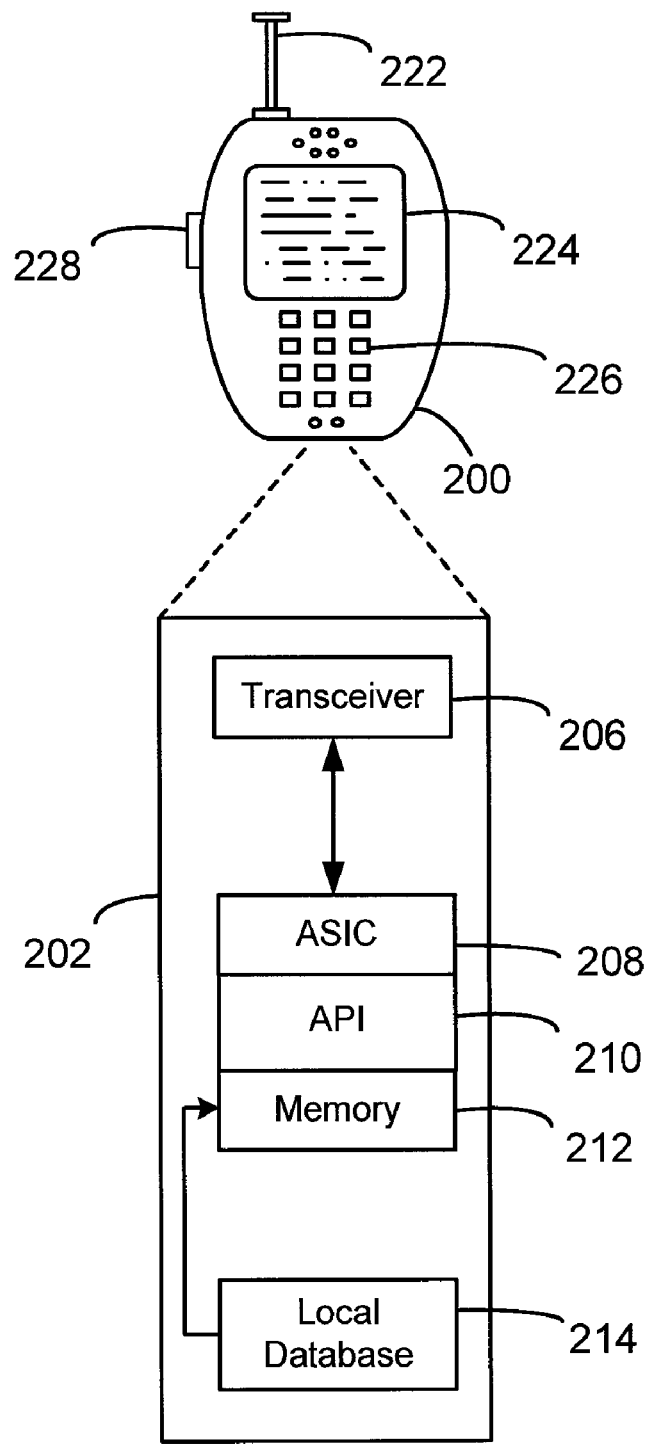
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations.

Accordingly, the illustrations provided herein are not intended to limit the embodiments of the invention and are merely to aid in the description of aspects of embodiments of the invention.

Figure 4:
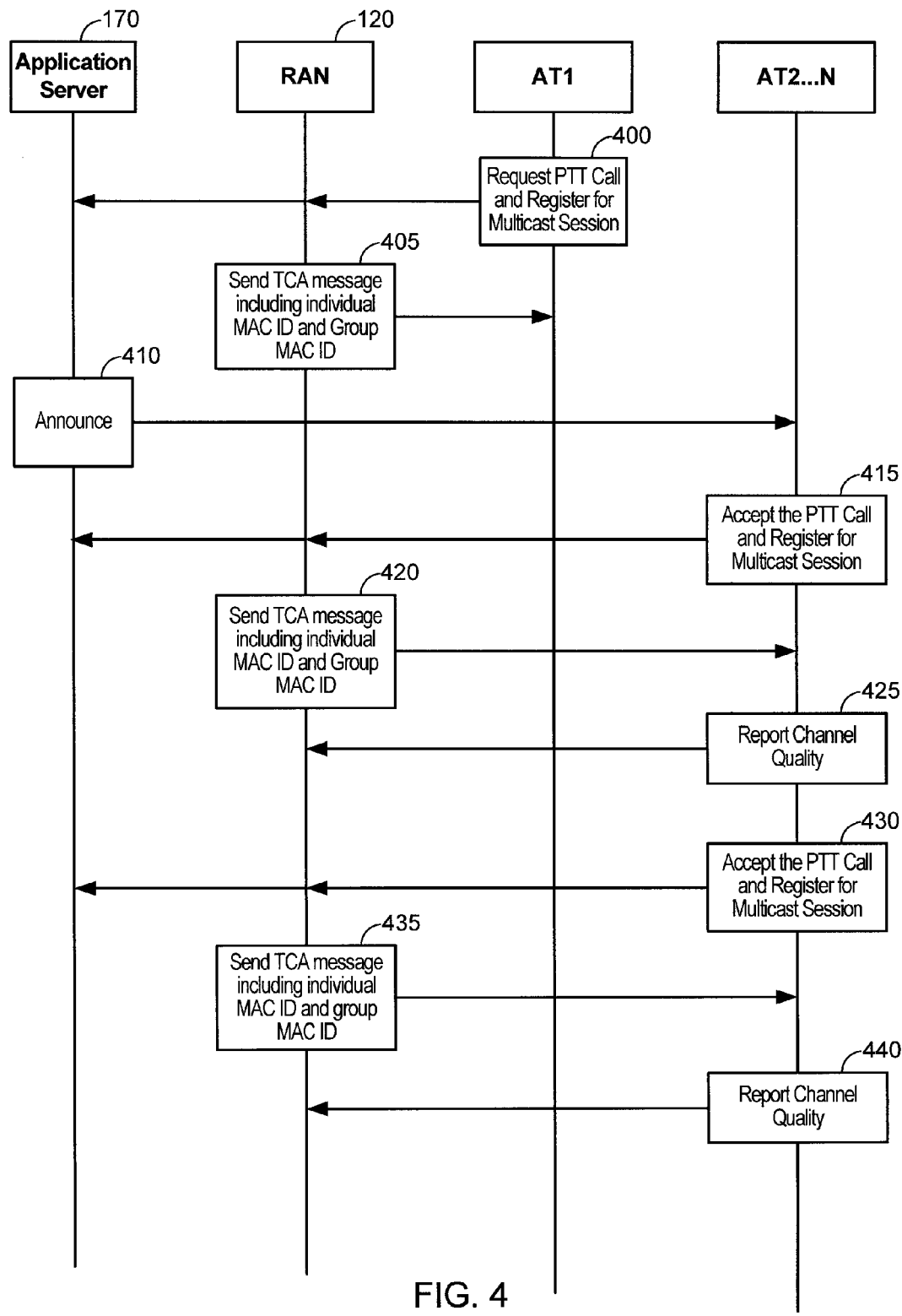
FIG. 4 is an illustration of a traffic channel assignment process.

FIG. 4 illustrates a conventional traffic channel assignment process. In particular, FIG. 4 illustrates a conventional traffic channel assignment process for multicast group members, or access terminals, registering for an announced push-to-talk (PTT) or multicast session.

In 400, AT 1, which is one of a plurality of access terminals in communication with the RAN 120, requests to initiate a PTT session, or multicast session. Accordingly, AT 1 sends a PTT call request and a multicast group registration request (e.g., a StorageBLOBNotification message, which will be discussed in greater detail below) to the application server 170 (e.g., a PTT server). Also in 400, AT 1 requests to register for the multicast or PTT session with the RAN 120.

In 405, upon receiving the request to register for the PTT session from AT 1, the RAN 120 sends, to AT 1 (i.e., the PTT session initiator), a traffic channel assignment (TCA) message including (i) an individual media access control (MAC) ID for identifying itself (i.e., AT 1) on the forward link and (ii) a group MAC ID for identifying the PTT session. The concept of the "group MAC ID" is discussed in greater detail in co-pending U.S. patent application Ser. No. 11/831,298, entitled "Systems and Methods for Improving Multicasting Over a Forward Link", filed on Jul. 31, 2007 and hereby incorporated by reference in its entirety. The individual MAC ID is used to assign or allocate access to the reverse link traffic channel or RTCH. For example, a multicast group member may access the RTCH to "speak" to the multicast group, to report channel quality, etc.

Accordingly, in subsequent communication, AT 1 will associate messages received on the forward link or downlink (i.e., from the RAN 120 to AT 1) which include the group MAC ID as associated with the PTT session initiated by AT 1 in 400, and AT 1 will associate messages received on the forward link or downlink which include the individual MAC ID as intended for AT 1. Thus, the individual MAC ID is a "unicast" identifier which identifies a single AT, whereas the group MAC ID is a "multicast" identifier that identifies the PTT session or multicast group.

Next, in 410, the application server 170 announces the PTT session to each multicast group member for the PTT session. For example, the application server 170 forwards the announce message to the RAN 120 via the PDSN 160 and/or BSN 165, and the RAN 120 transmits the announce message over the air interface 104 to a plurality of ATs.

In 415, a first AT or first responder among ATs 2 ... N ("AT 2"), responds to the announce message by sending an Accept Call message to the application server 170 (e.g., a PTT server) and registering for the announced PTT session with the RAN 120. For example, AT 2 may send a StorageBLOBNotification message which includes a Group Identification (ID) for the PTT session (e.g., which was initially included in the announce message), and a flow number ("RLPFlowNumber"). StorageBLOBNotification messages and RLPFlowNumbers are discussed in greater detail in the co-pending U.S. patent application Ser. No. 11/831,298, entitled "Systems and Methods for Improving Multicasting Over a Forward Link", filed on Jul. 31, 2007, which was incorporated by reference above in its entirety.

While not shown in FIG. 4, the user of AT 1 may begin the PTT session by "speaking" upon receiving a call status message from the application or PTT server 170 (e.g., subsequent to one or more multicast group members responding to the announce message) on the reverse link traffic channel.

In 420, the RAN 120 sends to AT 2 a traffic channel assignment (TCA) message including (i) an individual or unicast MAC ID for identifying itself (i.e., AT 2) on the forward link and (ii) the group MAC ID. Accordingly, in subsequent communications, AT 2 will associate messages received on the forward link or downlink (i.e., from the RAN 120 to AT 2) which include the group MAC ID as associated with the PTT session initiated by AT 1 in 400, and AT 2 will associate message received on the forward link or downlink which include the individual MAC ID as intended for AT 2.

In 425, AT 2 sends a channel quality indicator (CQI) on the reverse link traffic channel or RTCH to the RAN 120 indicating a measured channel quality of the forward link at AT 2. The CQI message sent from AT 2 to the RAN 120 in 425 is used by the RAN 120 to adjust transmission parameters for downlink multicast transmissions of the PTT session, as is known in the art.

Next, in 430, a plurality of additional ATs among ATs 2 ... N respond to the announce message by sending an Accept Call message to the application server 170 (e.g., a PTT server) and registering for the announced PTT session with the RAN 120. For example, each AT attempting to register for the PTT session may send a StorageBLOBNotification message, as discussed above with respect to 415.

In 435, for each AT among AT 2 ... N requesting registration in 425, the RAN 120 sends a traffic channel assignment (TCA) message including an individual MAC ID and the group MAC ID for identifying the PTT session. Accordingly, in subsequent communication, each AT among AT 2 ... N will associate messages received on the forward link or downlink (i.e., from the RAN 120 to AT 2 ... N) which include the group MAC ID as associated with the PTT session initiated by AT 1 in 400, and each AT among AT 2 ... N will associate messages received on the forward link or uplink which include an individual MAC ID as being intended for one particular AT among AT 2 ... N.

In 440, each AT that has registered for the PTT session and has been assigned an individual MAC ID (i.e., has been allocated RTCH access) sends a CQI to the RAN 120 indicating a measured channel quality of its forward link. As discussed above, the CQI messages sent from the ATs to the RAN 120 are used by the RAN 120 to adjust transmission parameters for downlink multicast transmissions of the PTT session. For example, the CQI reporting may be performed on a periodic basis.

As will be appreciated by one of ordinary skill in the art, as the number of multicast group members (i.e., ATs having registered for the PTT session) increases, the amount of traffic on the reverse link traffic channels (e.g., if a different R-TCH is allocated to each multicast group member) increases (e.g., due to the increased reporting of CQIs and/or messaging associated with the reverse pilot control channel, the error rate control channel, the DSC, etc.). Also, systems typically limit the total number of MAC IDs which the RAN 120 is capable of assigning. For example, the 1x EV-DO standard sets a hard limit of assignable MAC IDs (e.g., of 128 total MAC ID). The hard limit of 128 MAC IDs, for example, effectively reduces the number of MAC IDs to much lower numbers because a number of MAC IDs may already be assigned to other users for other applications (e.g., other than those ATs participating in the PTT session). In the above example of FIG. 4, one MAC ID is assigned to the group or PTT session ("group MAC ID") and N individual MAC IDs are assigned to each of the N ATs. The total number of assigned individual MAC IDs increases further if some ATs have multiple sectors in its Active Set. Thus, the MAC ID assignment process of FIG. 4 may not be capable of scaling to higher density multicast groups because at least N+1 MAC IDs may be required to support a PTT session having N participating ATs.

As discussed above, the number of MAC IDs available for assignment to prospective multicast group members for a PTT session can be relatively limited. Accordingly, a MAC ID provisioning process which is based on the number of MAC IDs available to the RAN 120 is described below.

Figure 5:
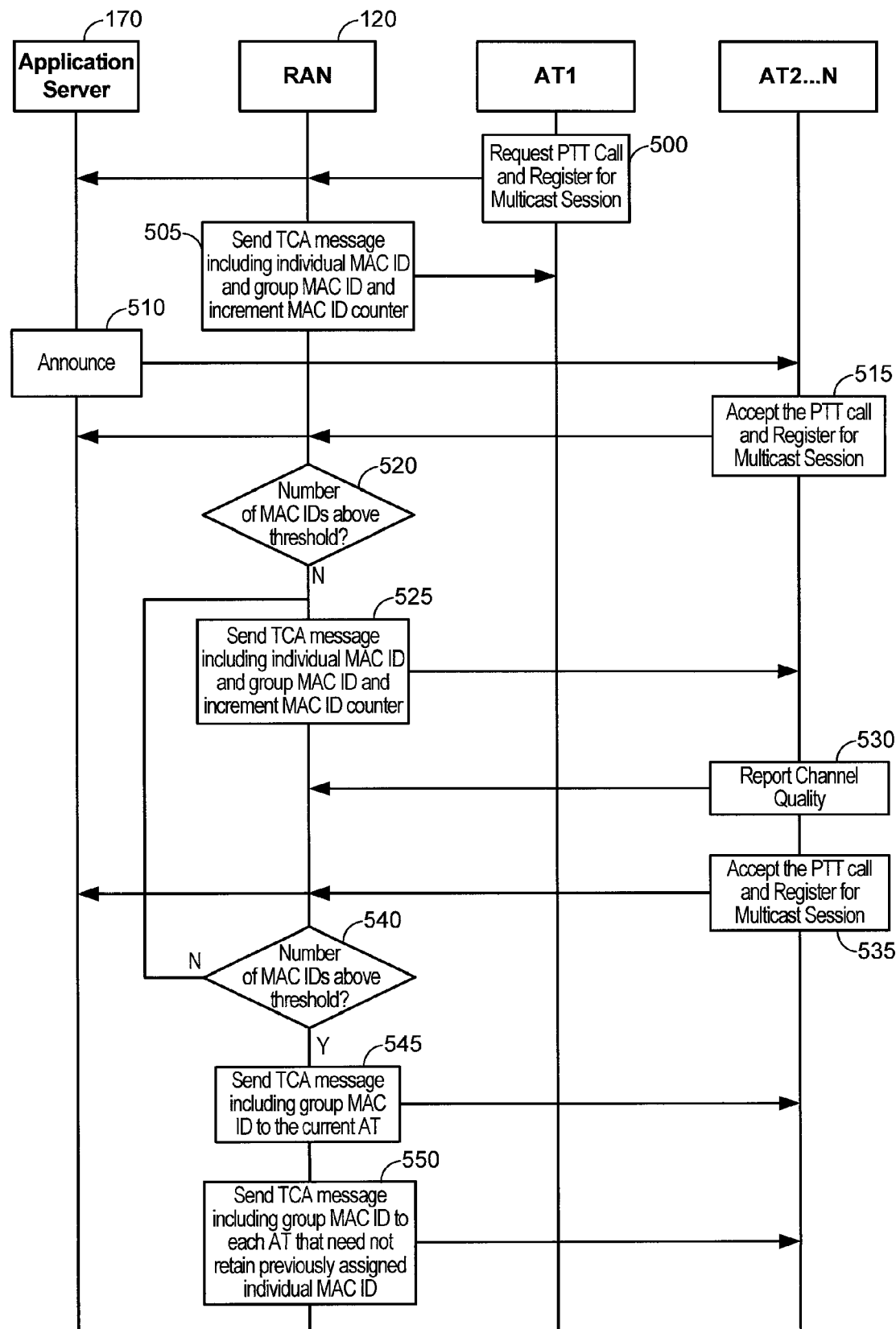
FIG. 5 is an illustration of a traffic channel assignment process according to at least one embodiment of the invention.

FIG. 5 illustrates a traffic channel assignment process according to an embodiment of the present invention. In 500, AT 1, which is one of a plurality of access terminals in communication with the RAN 120, requests to initiate a PTT session, or multicast session. Also in 500, AT 1 requests to register to the multicast session. Accordingly, AT 1 sends a PTT call request to the application server 170 (e.g., a PTT server) and a registration request to the RAN 120.

In 505, upon receiving a request to register for the PTT session from AT 1, the RAN 120 sends, to AT 1, a traffic channel assignment (TCA) message including (i) an individual media access control (MAC) ID for identifying itself on the forward link and (ii) a group MAC ID for identifying the PTT session. It will be appreciated that the RAN 120 can be configured to interpret a multicast registration message as an implicit request for a traffic channel without an explicit traffic channel request (e.g., a Connection Request message) being sent from the requesting AT. Alternatively, the multicast registration message can be bundled with a Connection Request message, or the Connection Request message can be sent separate from the multicast registration message. In these cases, the RAN 120 assigns the traffic channel to the requesting AT in response to the Connection Request message. Accordingly, in subsequent communication, AT 1 will associate messages received on the forward link or downlink (i.e., from the RAN 120 to AT 1) which include the group MAC ID as associated with the PTT session initiated by AT 1 in 500, and the RAN 120 will associate messages received on the reverse link or uplink (i.e., from AT 1 to the RAN 120) which include the individual MAC ID as being from AT 1. Also in 505, the RAN 120 increments a counter Current_MAC_ID_Number, which is described below in greater detail with respect to 520.

Next, in 510, the application server 170 announces the PTT session to each multicast group member for the PTT session. For example, the application server 170 forwards the announce message to the RAN 120 via the PDSN 160 and/or BSN 165, and the RAN 120 transmits the announce message over the air interface 104 to the ATs 1 . . . N.

In 515, a first AT or first responder ("AT 2") among ATs 2 . . . N responds to the announce message by accepting the announced PTT call and registering for the announced PTT session. Accordingly, AT 2 sends a PTT call request to the application server 170 (e.g., a PTT server) and a registration request to the RAN 120. For example, AT 2 may send a StorageBLOBNotification message which includes a Group Identification (ID) for the PTT session (e.g., which was initially included in the announce message), and a flow number ("RLPFlowNumber").

While not shown in FIG. 5, the user of AT 1 may begin the PTT session (e.g., by speaking) after receiving a call status message from the PTT server 170. Also in 515, the RAN 120 increments the counter Current_MAC_ID_Number, which is described below in greater detail with respect to 520.

Next, instead of simply sending an individual MAC ID and group ID to the AT requesting registration ("AT 2"), in 520, the RAN 120 determines whether the number of currently assigned MAC IDs ("Current_MAC_ID_Number") is above a MAC ID threshold. The MAC ID threshold may be set by a system designer based on the number of MAC IDs expected to be available for a given wireless communication protocol. For example, 1x EV-DO is capable of assigning a total of 128 MAC IDs. Thus, for 1x EV-DO, the MAC ID threshold may be set to, for example, 66. In another example, the MAC ID threshold need not be a static or fixed number, but can change based on one or more system criteria. For example, the MAC ID threshold may be set to a given percentage (e.g., 75%) of the number of available MAC IDs (i.e., the number of assignable MAC IDs that have not yet been assigned).

For convenience of explanation, assume that Current_MAC_ID_Number is less than the MAC ID threshold. Thus, once the RAN 120 determines the Current_MAC_ID_Number is less than the MAC ID threshold, the process advances to 525. For example, because AT 2 is the first responder to the announce message from 505, it is not likely that Current_MAC_ID_Number is greater than the MAC ID threshold because the RAN 120 has yet to assign any MAC IDs for the PTT session other than the group MAC ID and individual MAC ID for the PTT session initiator AT 1. However, it is understood that in other embodiments of the present invention, simply being a first responder to a PTT announce message need not imply that the MAC ID threshold cannot be exceeded. For example, if other PTT sessions are active, and the other active PTT sessions are assigned all of the MAC IDs assignable by the RAN 120, Current_MAC_ID_Number may exceed the MAC ID threshold despite AT 2 being a first responder.

In 525, the RAN 120 sends, to the current AT requesting registration (e.g., AT 2, 3, 4, . . . , N), a traffic channel assignment (TCA) message including (i) an individual MAC ID for identifying itself on the reverse link and (ii) the group MAC ID for identifying the PTT session. Accordingly, in subsequent communication, the current AT requesting registration, or AT 2, will associate messages received on the forward link or downlink (i.e., from the RAN 120 to AT 2) which include the group MAC ID as associated with the PTT session initiated by AT 1 in 500. Also in 525, the RAN 120 increments Current_MAC_ID_Number.

In 530, each registered AT (e.g., AT 2, etc.) sends a channel quality indicator (CQI) to the RAN 120 indicating a measured channel quality of its forward link, as described above with respect to 425 and 440 of FIG. 4. The CQI message sent from each registered AT to the RAN 120 in 530 is used by the RAN 120 to adjust transmission parameters for downlink multicast transmissions of the PTT session.

Next, in 535, another AT among ATs 2 . . . N attempts to accept the announced PTT call and register for the PTT session, as discussed above with respect to 515 (e.g., by sending a StorageBLOBNotification, or other registration message, as discussed above). In 540, the RAN 120 again determines whether Current_MAC_ID_Number is above the MAC ID threshold. If the RAN 120 determines that Current_MAC_ID_Number is not above the MAC ID threshold, the process returns to 525 and both an individual MAC ID and group MAC ID are sent to the current AT requesting registration (from the previous iteration of 535), and so on. Otherwise, if Current_MAC_ID_Number is determined to exceed the MAC ID threshold, the process advances to 545.

In 545, the RAN 120 sends a traffic channel assignment message including the group MAC ID, but not an individual or unicast MAC ID, to the current AT requesting registration (from a previous iteration of 535). In 550, the RAN 120 sends a "supplemental" traffic channel assignment message including the group MAC ID, but not an individual or unicast MAC ID, to each AT previously assigned an individual MAC ID if the previously assigned AT(s) do not need to maintain their individual MAC IDs, as will be discussed below in greater detail.

The RAN 120 may determine which multicast group member(s) or AT(s) do not need to maintain an individual MAC ID, for example, based on a certain period of data inactivity. In an example, the RAN 120 starts an inactivity timer when the RAN 120 detects that Current_MAC_ID_Number rises above the MAC ID threshold. If no data is transmitted to a given AT on the given AT's forward traffic channel (FTCH), and if no data is received from the given AT on the given AT's reverse traffic channel (RTCH), before the timer expires, the RAN 120 sends the TCA message in 550 to de-allocate the individual MAC ID (i.e., individual traffic channel) previously assigned to the AT, as will be discussed in greater detail below with respect to FIG. 6. In this example, if the above-mentioned AT is the current floor holder or speaker, or is running an application(s) other than the PTT session, the RAN 120 will be able to detect data activity before the inactivity timer expires (i.e., activity data received from the AT and/or non-PTT activity). In this case, the RAN 120 need not de-allocate the traffic channel, and the "supplemental" traffic channel message would not be sent to the AT in 550.

After sending the traffic channel assignment messages in 550, the previously sent individual MAC IDs for ATs to which the supplemental traffic channel assignment messages are sent are considered to be withdrawn by the RAN 120. Thus, the RAN 120 adjusts (e.g., decreases) the Current_MAC_ID_Number to account for the new number of assigned MAC IDs after factoring out the withdrawn MAC IDs. Also, subsequent to 550, while not shown explicitly within FIG. 5, at the RAN 120, in response to subsequent registration requests (e.g., as in 510, 535, etc.) from ATs requesting to register to the PTT session, the RAN 120 transmits traffic channel assignments with the group MAC ID only, and not an individual MAC ID for the requesting AT.

Figure 6:
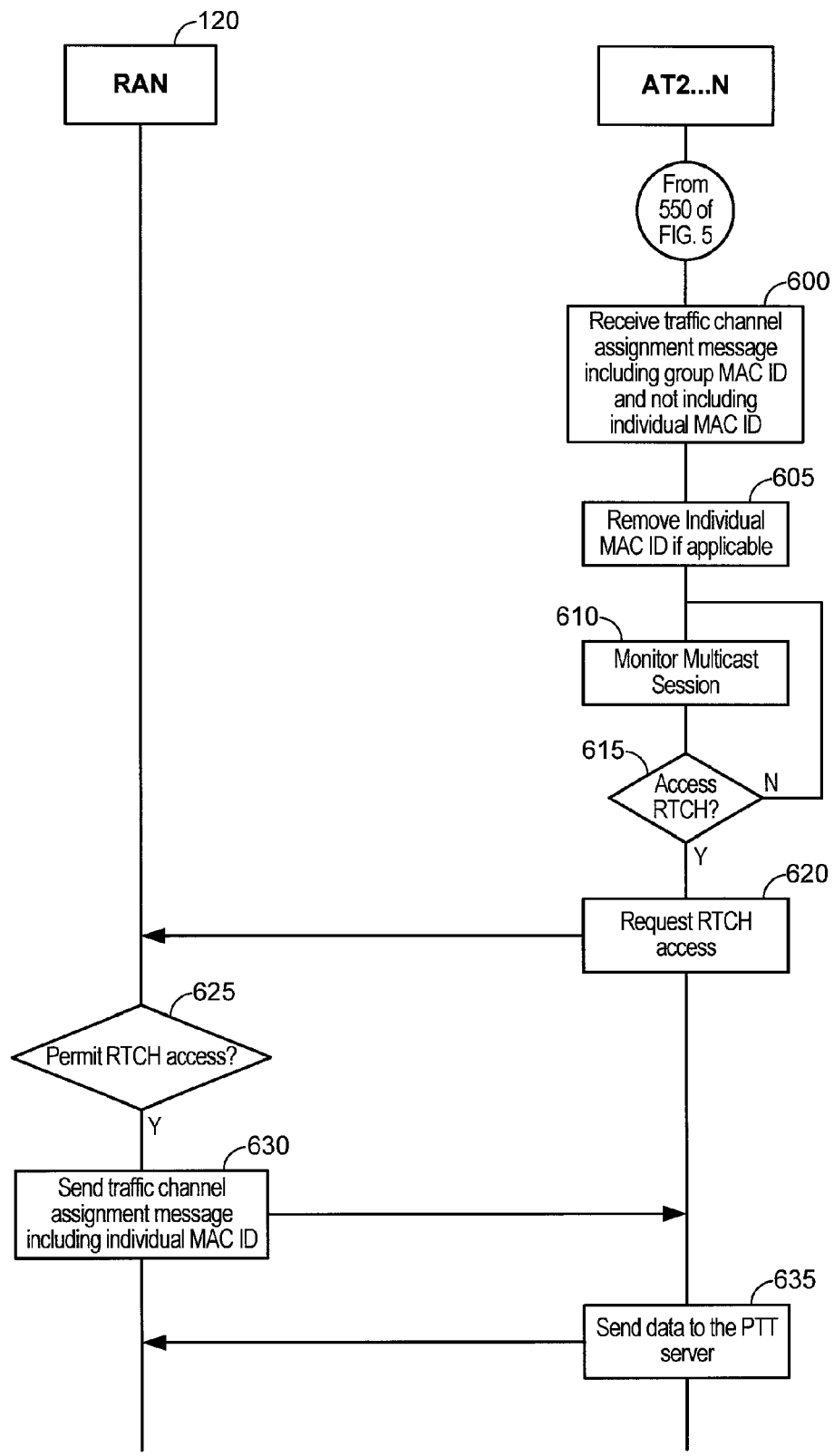
FIG. 6 illustrates a continuation of the process of FIG. 5.

FIG. 6 illustrates a continuation of the process of FIG. 5. In 600, the current AT requesting registration (from the previous iteration of 535) receives the traffic channel assignment message including the group MAC ID without an individual MAC ID, and each AT previously assigned an individual MAC ID, whose data inactivity timer has expired, receives the supplemental traffic channel assignment message having only the group MAC ID. Next, each AT previously assigned an individual MAC ID and receiving the supplemental traffic channel assignment, 600, removes or withdraws the previously assigned individual or unicast MAC ID in 605. It will be appreciated that the current AT requesting registration need not perform the individual MAC ID withdrawal because the current AT requesting registration has not yet received any MAC IDs for the PTT session. Accordingly, after the individual MAC ID withdrawal of 605, as few as two MAC IDs may remain assigned in support of the PTT session: (1) the group MAC ID and (2) the individual MAC ID for the current floor-holder. However, it will be appreciated that the number of MAC IDs remaining is actually two plus the number of ATs maintaining their individual MAC ID due to data activity on the individual traffic channel. In FIG. 6, assume that PTT initiator AT 1 (not shown in FIG. 6) remains the current floor-holder, and that none of ATs 2 . . . N maintain their individual MAC IDs. Thus, in FIG. 6, each of ATs 2 . . . N withdraw/remove their individual MAC IDs in 605.

In 610, each of ATs 2 . . . N monitor the multicast or PTT session based on the group MAC ID. In other words, any downlink multicast communications from the RAN 120 addressed to the group MAC ID are decoded at the multicast group members or ATs. However, the ATs 2 . . . N that are not assigned an individual MAC ID (e.g., due to withdrawal in 605, etc.) do not report periodic CQIs or other feedback on the reverse link channel (e.g., because they do not have individual MAC IDs which are used to allocate access to the reverse link channel, such as the RTCH). Accordingly, this mode of operation may be referred to as "non-feedback" mode, whereas operation where periodic CQI responses tagged with an individual MAC ID identifying the reporting AT are reported may be referred to as "feedback" mode. In an example, during feedback mode, the RAN 120 may control forward link transmission parameters based on the feedback (e.g., CQI responses) received from the ATs, and during non-feedback mode, the RAN 120 may set the forward link transmission parameters relatively conservatively (e.g., similar to forward link transmission parameters used on the forward link control channel).

In 615, each of ATs 2 . . . N determines whether to "speak" to the multicast group (e.g., instead of merely "listening" or "monitoring" the multicast session). If a given multicast group member determines to speak to the group, the given multicast group member sends a connection request to the RAN 120 requesting reverse link channel access, 620.

In 625, the RAN 120 receives the reverse link channel access request from the AT, and determines whether to permit reverse link access. For example, the RAN 120 may determine whether the current number of assigned MAC IDs (e.g., including both group MAC IDs and individual MAC IDs) exceeds a generic system threshold (e.g., which may be different than the MAC ID threshold discussed above). If the RAN 120 determines that the total current number of assigned MAC IDs exceeds the generic system threshold, the RAN 120 denies RTCH access and no traffic channel assignment (TCA) message including an individual MAC ID is sent to the requesting AT. Otherwise, if the RAN 120 determines that the total current number of assigned MAC IDs does not exceed the generic system threshold, the RAN 120 permits RTCH access by sending a traffic channel assignment (TCA) message including an individual MAC ID to the requesting AT. The generic system threshold does not necessarily correspond to the MAC ID Threshold, but rather can be higher than the MAC ID threshold. The generic system threshold may correspond, for example, to a system limit for the number of assignable MAC IDs. Likewise, the total current number of assigned MAC IDs does not necessarily correspond to Current_MAC_ID_Number because applications other than the PTT session may be using other MAC IDs (e.g., other PTT sessions, etc.).

Accordingly, if the RAN 120 determines to permit reverse link channel access in 625, the RAN 120 sends a supplemental traffic channel assignment message to the requesting AT including an individual MAC ID to allocate the reverse link traffic channel to the requesting AT, 630, thereby granting the requesting AT the floor. The requesting AT may then send data to the PTT server 170 via the RAN 120 over the RTCH, which the PTT server 170 may then forward to the multicast group members participating in the PTT session, 635. Further, while not illustrated in FIG. 6, the RAN 120 may also send a traffic channel assignment message including only the group MAC ID, and not an individual MAC ID, to the old floor-holder (e.g., PTT initiator AT 1) in 630, to withdraw the individual MAC ID from the old floor-holder (e.g., because AT 1 no longer has the floor for the PTT session) after a certain period of data inactivity.

While not illustrated in FIG. 6, the RAN 120 may, from time to time, send supplemental traffic channel assignment messages to ATs granted reverse link channel access, as in 620, 625, after a certain period of data inactivity on their individual traffic channels.

Further, as discussed above, CQI reports are used, during "feedback" mode, to adjust downlink transmission parameters such that multicast group members can receive multicast messages in a PTT session with an adequate signal quality. In "non-feedback" mode, CQI reports are generally not sent (e.g., except when the RTCH is explicitly requested as in 620 of FIG. 6). Thus, in non-feedback mode, the RAN 120 may establish relatively conservative transmission characteristics (e.g., such as the control channel data rate) to account for the lack of CQIs from the multicast group members.

Accordingly, it will be appreciated that the MAC ID assignment process described above with respect to FIGS. 5 and 6 may scale with the number of multicast group members without necessarily being limited by the number of available MAC IDs.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of assigning traffic channels, comprising:
maintaining a counter indicating a number of access terminals that have been assigned unicast traffic channels for a multicast session, each of the assigned unicast traffic channels associated with a different individual access terminal identifier;
receiving a request to register for the multicast session from an access terminal;
determining whether to assign a unicast traffic channel to the access terminal, for the access terminal to provide feedback associated with the multicast session, based on the number of access terminals that have been assigned unicast traffic channels for the multicast session and/or for applications other than the multicast session;
configuring a traffic channel assignment message to include an identifier for the multicast session, and to further include an assignment of the unicast traffic channel if the determining step determines to assign the unicast traffic channel to the access terminal; and
sending the traffic channel assignment message to the access terminal including at least the multicast session identifier.

2. The method of claim 1, further comprising:
sending data for the multicast session on a forward multicast channel identified by the multicast session identifier; and
adjusting a transmission format on the forward multicast channel based on feedback received on the assigned unicast traffic channels for the multicast session.

3. The method of claim 1, wherein the maintaining step includes:
incrementing the counter if one or more additional access terminals are assigned a unicast traffic channel for the multicast session, and decrementing the counter if a previously assigned unicast traffic channel at one or more of the access terminals is withdrawn.

4. The method of claim 1, wherein the determining step includes:
comparing the counter with a threshold value.

5. The method of claim 4, wherein the threshold value is a fixed value being less than a hard limit of total assignable media access layer (MAC) IDs.

6. The method of claim 4, wherein the threshold value is dynamic and changes based on a number of media access layer (MAC) IDs that have not yet been assigned or based on a number of assigned traffic channels.

7. The method of claim 4, wherein the sending step sends the traffic channel assignment message to assign the unicast traffic channel to the access terminal if the comparison indicates that the counter is not above the threshold value.

8. The method of claim 4, wherein the sending step sends the traffic channel assignment message without assigning the unicast traffic channel access at least to the access terminal if the comparison indicates that the counter is above the threshold value.

9. The method of claim 8, further comprising:
sending data for the multicast session on a forward multicast channel identified by the multicast session identifier; and
adjusting a transmission format on the forward multicast channel to a conservative format.

10. The method of claim 9, wherein the conservative format is a control channel format.

11. The method of claim 8, further comprising:
determining, for each access terminal that was previously assigned a unicast traffic channel for the multicast session, whether to withdraw the previously assigned unicast traffic channel; and
if the determining whether to withdraw step determines to withdraw at least one previously assigned unicast traffic channel, withdrawing the at least one previously assigned unicast traffic channel by sending a supplemental traffic channel assignment message to each access terminal associated with the at least one previously assigned unicast traffic channel to withdraw the at least one previously assigned unicast traffic channel.

12. The method of claim 11, wherein the determining whether to withdraw step is based on how long each of the previously assigned unicast traffic channels has been inactive on a reverse link.

13. The method of claim 11, wherein the determining whether to withdraw step determines not to withdraw unicast traffic channels for access terminals that have requested to maintain their unicast traffic channel.

14. The method of claim 1, wherein the sending step sends the traffic channel assignment message including the multicast session identifier and not including an individual access terminal identifier for unicast traffic channel assignment if the determining step determines not to assign the unicast traffic channel to the access terminal.

15. The method of claim 1, wherein the sending step sends the traffic channel assignment message including the multicast session identifier and an individual access terminal identifier for unicast traffic channel assignment if the determining step determines to assign the unicast traffic channel to the access terminal.

16. The method of claim 15, wherein the multicast session identifier is the group media access layer (MAC) identifier (ID) and the individual access terminal identifier is an individual MAC ID.

17. The method of claim 1, wherein the multicast session identifier is a group media access layer (MAC) identifier (ID).

18. The method of claim 1, wherein the request to register for the multicast session is received in response to a previously sent announce message announcing the multicast session.

19. An access network in a wireless communications system, comprising:
means for maintaining a counter indicating a number of access terminals that have been assigned unicast traffic channels for a multicast session, each of the assigned unicast traffic channels associated with a different individual access terminal identifier;
means for receiving a request to register for the multicast session from an access terminal;
means for determining whether to assign a unicast traffic channel to the access terminal, for the access terminal to provide feedback associated with the multicast session, based on the number of access terminals that have been assigned unicast traffic channels for the multicast session and/or for applications other than the multicast session;
means for configuring a traffic channel assignment message to include an identifier for the multicast session, and to further include an assignment of the unicast traffic channel if the means for determining determines to assign the unicast traffic channel to the access terminal; and
means for sending the traffic channel assignment message to the access terminal including at least the multicast session identifier.

20. The access network of claim 19, further comprising:
means for sending data for the multicast session on a forward multicast channel identified by the multicast session identifier; and
means for adjusting a transmission format on the forward multicast channel based on feedback received on the assigned unicast traffic channels for the multicast session.

21. The access network of claim 19, wherein the means for sending sends the traffic channel assignment message including the multicast session identifier and not including an individual access terminal identifier for unicast traffic channel assignment if the means for determining determines not to assign the unicast traffic channel to the access terminal.

22. The access network of claim 19, wherein the means for sending sends the traffic channel assignment message including the multicast session identifier and an individual access terminal identifier for unicast traffic channel assignment if the means for determining determines to assign the unicast traffic channel to the access terminal.

23. An access network in a wireless communications system, comprising:
logic configured to maintain a counter indicating a number of access terminals that have been assigned unicast traffic channels for a multicast session, each of the assigned unicast traffic channels associated with a different individual access terminal identifier;
logic configured to receive a request to register for the multicast session from an access terminal;
logic configured to determine whether to assign a unicast traffic channel to the access terminal, for the access terminal to provide feedback associated with the multicast session, based on the number of access terminals that have been assigned unicast traffic channels for the multicast session and/or for applications other than the multicast session;

logic configured to configure a traffic channel assignment message to include an identifier for the multicast session, and to further include an assignment of the unicast traffic channel if the logic configured to determine determines to assign the unicast traffic channel to the access terminal; and logic configured to send the traffic channel assignment message to the access terminal including at least the multicast session identifier.

24. The access network of claim 23, further comprising:

logic configured to send data for the multicast session on a forward multicast channel identified by the multicast session identifier; and logic configured to adjust a transmission format on the forward multicast channel based on feedback received on the assigned unicast traffic channels for the multicast session.

25. The access network of claim 23, wherein the logic configured to send sends the traffic channel assignment message including the multicast session identifier and not including an individual access terminal identifier for unicast traffic channel assignment if the logic configured to determine determines not to assign the unicast traffic channel to the access terminal.

26. The access network of claim 23, wherein the logic configured to send sends the traffic channel assignment message including the multicast session identifier and an individual access terminal identifier for unicast traffic channel assignment if the logic configured to determine determines to assign the unicast traffic channel to the access terminal.

27. A non-transitory computer-readable medium comprising instructions, which, when executed by an access network in a wireless communications system, cause the access network to perform operations, the instructions comprising:

program code to maintain a counter indicating a number of access terminals that have been assigned unicast traffic channels for a multicast session, each of the assigned unicast traffic channels associated with a different individual access terminal identifier;

program code to receive a request to register for the multicast session from an access terminal;

program code to determine whether to assign a unicast traffic channel to the access terminal, for the access terminal to provide feedback associated with the multicast session, based on the number of access terminals that have been assigned unicast traffic channels for the multicast session and/or for applications other than the multicast session;

program code to configure a traffic channel assignment message to include an identifier for the multicast session, and to further include an assignment of the unicast traffic channel if the program code to determine determines to assign the unicast traffic channel to the access terminal; and program code to send the traffic channel assignment message to the access terminal including at least the multicast session identifier.

28. The non-transitory computer-readable medium of claim 27, further comprising:

program code to send data for the multicast session on a forward multicast channel identified by the multicast session identifier; and program code to adjust a transmission format on the forward multicast channel based on feedback received on the assigned unicast traffic channels for the multicast session.

29. The non-transitory computer-readable medium of claim 27, wherein the program code to send sends the traffic channel assignment message including the multicast session identifier and not including an individual access terminal identifier for unicast traffic channel assignment if the program code to determine determines not to assign the unicast traffic channel to the access terminal.

30. The non-transitory computer-readable medium of claim 27, wherein the program code to send sends the traffic channel assignment message including the multicast session identifier and an individual access terminal identifier for unicast traffic channel assignment if the program code to determine determines to assign the unicast traffic channel to the access terminal.

31. A method of assigning traffic channels, comprising:

receiving, from an access terminal, a request to register for a multicast session to be carried on a downlink shared channel;

determining whether to assign a unicast traffic channel to the access terminal, for the access terminal to provide feedback associated with the multicast session while the multicast session is being carried on the downlink shared channel, based on a number of access terminals that have been assigned unicast traffic channels for the multicast session and/or for applications other than the multicast session;

configuring a traffic channel assignment message to include an identifier for the multicast session, and to further include an assignment of the unicast traffic channel if the determining step determines to assign the unicast traffic channel to the access terminal; and sending the traffic channel assignment message to the access terminal including at least the multicast session identifier.

* * * * *